(12) United States Patent
Sheppard

(10) Patent No.: US 12,590,731 B2
(45) Date of Patent: Mar. 31, 2026

(54) HYDRAULIC UNIT

(71) Applicant: IDZV LTD, Peacehaven (GB)

(72) Inventor: Luke Michael Sheppard, Peacehaven (GB)

( * ) Notice: Subject to any disclaimer, the term of this patent is extended or adjusted under 35 U.S.C. 154(b) by 350 days.

(21) Appl. No.: 18/266,883

(22) PCT Filed: Dec. 23, 2021

(86) PCT No.: PCT/IB2021/062252
§ 371 (c)(1),
(2) Date: Jun. 13, 2023

(87) PCT Pub. No.: WO2022/137196
PCT Pub. Date: Jun. 30, 2022

(65) Prior Publication Data
US 2024/0053060 A1 Feb. 15, 2024

(30) Foreign Application Priority Data

Dec. 23, 2020 (GB) ...................................... 2020450

(51) Int. Cl.
F24H 15/305 (2022.01)
F24H 15/212 (2022.01)
(Continued)

(52) U.S. Cl.
CPC ......... F24H 15/305 (2022.01); F24H 15/212 (2022.01); F24H 15/238 (2022.01); F24H 15/31 (2022.01); G05D 23/1934 (2013.01)

(58) Field of Classification Search
CPC .... F24H 15/305; F24H 15/212; F24H 15/238; F24H 15/31; F24D 2220/0264;
(Continued)

(56) References Cited

U.S. PATENT DOCUMENTS 9,810,438 B2 * 11/2017 Rothman ............... G05B 15/02
10,429,864 B2 * 10/2019 Gustafsson .......... G05D 7/0641
(Continued)

FOREIGN PATENT DOCUMENTS

DE 19512995 A1 10/1995
EP 3115703 A1 1/2017
(Continued)

OTHER PUBLICATIONS

"Notification of Transmittal of the International Preliminary Report on Patentability" in PCT/IB2021/062252, mailed Mar. 30, 2023.
(Continued)

*Primary Examiner* — Nelson J Nieves
(74) *Attorney, Agent, or Firm* — William H. Bollman

(57) ABSTRACT

A hydraulic unit is for use in a multi zone heating system. The hydraulic unit comprises a variable output pump; a plurality of independently controllable valves, each valve being associated with one heating zone; and at least one temperature sensor. Each heating zone receives a heated water supply from a common heat source via the pump. The heating system includes a controller comprising a processor which receives signals from the at least one temperature sensor which processes the signals in accordance with control software. Command signals are sent to the pump and the plurality of independently controllable valves, to vary the flow rate of water from the common heat source to each of the heating zones independently one to another. Remote fault diagnosis and control is also provided.

15 Claims, 8 Drawing Sheets

(51) Int. Cl.
    *F24H 15/238*     (2022.01)
    *F24H 15/31*     (2022.01)
    *G05D 23/19*     (2006.01)

(58) Field of Classification Search
    CPC .......... F24D 2220/044; F24D 19/1015; F24D 19/1039; F24D 19/1066; F24D 19/1012; F24D 3/08
    See application file for complete search history.

(56) References Cited

U.S. PATENT DOCUMENTS

| | | | |
|---|---|---|---|
| 2007/0209719 A1* | 9/2007 | Shafique | F16K 27/06 137/614.2 |
| 2010/0198417 A1* | 8/2010 | Deivasigamani | F24H 15/31 700/282 |
| 2012/0138149 A1* | 6/2012 | Hatada | F24H 9/2035 122/367.1 |
| 2013/0048114 A1 | 2/2013 | Rothman et al. | |
| 2014/0196485 A1* | 7/2014 | Lombardo | B60H 1/00899 62/89 |
| 2014/0284391 A1* | 9/2014 | Schmidlin | G05D 23/1932 236/1 C |
| 2015/0293505 A1* | 10/2015 | Acosta Gonzalez | G05D 7/0617 |
| 2016/0291608 A1* | 10/2016 | Reider | F24D 19/1015 |
| 2018/0266703 A1* | 9/2018 | Guilherme | F24H 15/36 |
| 2022/0196250 A1* | 6/2022 | Scholz | G05B 15/02 |

FOREIGN PATENT DOCUMENTS

| | | | |
|---|---|---|---|
| EP | 3404499 A1 | 11/2018 | |
| JP | 2014163594 A * | 9/2014 | F24F 11/85 |
| JP | 2017020672 A * | 1/2017 | F24D 19/1072 |
| WO | 03/052324 A2 | 6/2003 | |

OTHER PUBLICATIONS

"Notification of Transmittal of the International Search Report and the Written Opinion of the International Searching Authority, or the Declaration" in PCT/IB2021/062252, mailed Mar. 31, 2022.

"Combined Search and Examination Report under Sections 17 and 18(3)" in GB2020450.9, mailed Jan. 27, 2021.

Combined Search and Examination Report under Sections 17 and 18(3), Clarity of Claims 1-15 in GB2020450.9, mailed Jan. 27, 2021.

Combined Search and Examination Report under Sections 17 and 18(3), Documents considered to be relevant in GB2020450.9, mailed Jan. 27, 2021.

* cited by examiner

HYDRAULIC UNIT

FIELD OF THE INVENTION

The present invention relates to a hydraulic unit for use in a multi-zone heating system. In particular, some embodiments of the invention relate to a multi-zone heating system.

BACKGROUND

Heating systems, such as domestic heating and water supply systems, typically include a plurality of zones which may each comprise a closed loop heating system connected to a heat source. The zones may for example include at least one hot water supply and at least one space heating loop (for example a plurality of radiators distributed around a premises). The heat source may be a water boiler/heater (including for example a combi-boiler) and may for example be a gas-powered water boiler but could include other heat sources such as solar powered water heating.

Domestic heating and hot water systems may also be referred to as central heating systems due to the use of a centralised heat source and associated piping to distribute the heat therefrom.

Typically, as domestic heating systems generally use a single heat source to supply both hot water and heating, they must balance the energy usage for these different heating zones. This impacts both the usage and efficiency of the system.

PRIOR ART

U.S. Pat. No. 10,649,508 (Computime Ltd) discloses a heating/cooling system that modulates the temperature of water flowing through a hydronic emitter by mixing water flows through a mixing valve. The mixing valve has an inlet connected to a water flow pipe, an inlet connected to a water return pipe, and an outlet connected to the hydronic emitter. Water flows through the inlets are configured to obtain a desired mixed water flow at a targeted temperature through the outlet. A controller receives temperature information from a thermometer and then determines the targeted temperature of the outlet. The heating/cooling system may support one or more heating/cooling zones and may operate either in a heating or a cooling mode.

The applicant's granted UK patent GB-B-2 568 947 (IDZV ltd) discloses a combi-boiler device with first and second heat exchangers and an internal boiler channel which leads from the first heat exchanger to the second heat exchanger. A heating channel, for example for a central heating system, delivers a hot water via a channel and a diverter.

The diverter is arranged to divert heated water from the first heat exchanger to the heating channel or the second heat exchanger, and to allow a partial heating channel flow until the second exchanger has reached a predefined temperature. Hence, instead of cutting off hot water supply to the heating channel, when a tap is turned on, both the heating and hot water channels may be supplied simultaneously.

The diverter may comprise a dual zone valve fitted with independent actuators.

Published international patent application number WO-A2-03/052324 (IMI Vision Limited) discloses a heating system with a plurality of zones, connected in a fluid circuit which includes a boiler and a pump and separate flow control devices for each zone. Each device is operable via a control unit to vary the flow in an associated zone independently of the other zones to achieve a desired temperature in each zone. Zones may be isolated from the fluid circuit.

United States patent application number US 2013/0048114 (Optimum Energy LLC) discloses a hydronic distribution system with self-regulating valves networked together. Valve temperatures and valve positions are controlled by a controller such as a microprocessor processes the temperatures and positions of the valves and then computes a desired speed for one or more variable speed pumps within the system. Pumps are controlled to operate at the desired speed and maintain the correct amount of process fluid flow needed by the system thereby reducing the overall energy use of the distribution system.

European patent application number EP 3 115 703 (Siemens AG) discloses a controller for a heating, ventilation and air conditioning (HVAC) installation, with at least two heat exchangers and a pump. Each heat exchanger has an adjustable valve which communicates with the pump and the controller. The position of the valves are varied in dependence on a temperature measurement temperature rise.

DE19512995A1 (Vaillant GmbH) discloses a central heating system with a single control which operates a boiler only if at least one of the valves controlling each room is open. The heating system comprises a boiler, a circulation pump and heat exchangers in each room. A distributor feeds each room circuit through on/off valves. The central control unit registers the boiler output temperature by means of a sensor, and the condition of the valves, and switches on the boiler and/or the pump accordingly.

European patent application number EP 3 404 499 (QSEC AB) discloses a computer implemented method for post installation adjustment of a climate system including determining a desired change of at least one radiator flow.

Although successful the inventor has recognised that it may be advantageous to provide additional functionality for use as part of, or in conjunction with, an existing multi-zone heating system; or as part of new combined heating ventilation and air conditioning (HVAC) systems to provide improved operational flexibility and/or efficiency.

SUMMARY OF THE INVENTION

According to a first aspect of the invention, there is provided hydraulic unit for use in a multi zone heating system including a common heat source therefor, a pump and a plurality of heating zones, at least one heating zone has a plurality of sub-zones and further comprising a hydraulic unit, wherein the hydraulic unit includes a plurality of independently controllable valves, each of the independently controllable valves is associated with a supply to each of the heating zones and is operative to supply a zone, and any sub-zone therewithin, with heated water from the common heat source via the pump, the hydraulic unit comprises a controller which operates the plurality of independently controllable valves and controls an output of the pump;

the hydraulic unit further comprises a flow sensor, at least one temperature sensor and a processor which receives a temperature signal from the at least one temperature sensor, associated with a heating zone, and a flow signal from a flow sensor, associated with a heating zone, the processor is operative to process the temperature signal and the flow signal in accordance with control software and to issue a command signal to the pump and to at least one of the independently controllable valves to vary the flow rate of water from the common heat source to the heating zone associated with the flow signal and the temperature signal, whereby the at least one independently controllable valve is operable to divert heated water to a zone in response to at least one temperature signal from a temperature sensor associated with the at least one zone, characterised in that one or more sub-zones includes radiators having modulating valves; and a controller comprises a processor which receives signals from the at least one temperature sensor, flow sensor or pressure differential sensor; the processor processes the signals in accordance with control software and issues command signals to the pump and a plurality of independently controllable, modulating valves, to vary the flow rate of water from the common heat source to each of the heating zones independently one to another, thereby enabling the hydraulic unit to control balancing of heating of sub-zones.

As each heating zone receives a heated water supply from a common heat source via the pump the temperature of each zone can be monitored and controlled independently of another zone. This is due to the heating system having a controller which comprises a processor which receives signals from the at least one temperature sensor, flow sensor or pressure differential sensor. The processor then processes the signals in accordance with control software and issues command signals to the pump and the plurality of independently controllable, modulating valves, to vary the flow rate of water from the common heat source to each of the heating zones independently one to another.

Through the provision of a variable output pump, embodiments of the invention can provide (or modify) a heating system to optimise the efficiency of the system by configuring the controller to modulating the pump to adjust the flow through the heating zones to a specific rate.

In addition modulating zone valves may be used to reduce or increase bore diameter depending on flow rates needed at all or specific zones, or temperature fluctuation at all or specific zones, thus constantly balancing a system depending on the amount of demand needed.

Having a temperature sensor and a pressure differential/flow sensor assigned to each independent zone therefore allows an entire hydraulic system to optimise efficiency, as data provided by sensors, enables maximum efficiency to be achieved by balancing the system and using minimum amounts of energy to provide optimum efficiency across the system. The system also lends itself to rapid fault diagnosis and fault location, as well as remote monitoring as described below.

For example, when a first zone has a low flow rate and low temperature while another has a high flow rate and high temperature returning to the heat source, the hydraulic unit dynamically reduces flow to the first zone to even out flow and temperature between the two zones. However, it is not only pump speed that is altered. Additional fine control is achieved by selective control of the modulating valves by reducing/increasing their bore size automatically to create a restriction. This therefore causes a natural diversion to allow flow to the other zones.

This is where large amounts of energy may be saved.

Physically the hydraulic unit may be retrofitted so it is integral with or fitted separately from the heat source depending upon system configuration. Typically, the hydraulic unit is provided in a return loop section of the multi-zone heating system. The hydraulic unit may be configured to operate independently of the heat source.

Modulating valves may be fitted in each individual dwelling and operable to communicate with the controller wirelessly, with a main hydraulic unit, which may be located in a basement or plant room. Modulating valves ideally include a flow sensor or a pressure differential sensor. A temperature sensor is preferably also provided to record data to send to the controller from each individual dwelling, zone or room.

This is very important when retrofitting a unit to an existing system where additional pipes cannot always be installed to allow full control over every return pipe leading back to the heat source via individual dwellings within a building. More specifically in some embodiments the hydraulic unit may be configured to continue operating when the heat source shuts down. This enables the hydraulic unit to improve efficiency of the heating system by continuing to run until the temperatures in the system have stabilised.

It is appreciated that at least one temperature sensor is associated with each heating zone.

The at least one temperature sensor may be on a return line to the heat source.

The at least one flow sensor or pressure differential sensor ideally comprises at least one flow sensor or pressure differential with each heating zone.

The at least one flow sensor or pressure differential sensor may be located on an outbound or on a return line to the heat source.

The control software is operable to receive a demand signal for at least one heating zone. For example, the demand signal may include a demand for hot water from a zone or a request for space heating (for example a setting of a target temperature or ambient temperature dropping below a target). The control software compares the demand to the signals from the at least one temperature sensor and flow sensor/pressure differential sensor when determining a required flow rate to issue a command to signal to the pump, modulating zone valves and heat source. This allows the system to self-balance, thus again ensuring that operation is always at maximum efficiency when the heater and pump are running.

The control software may monitor a rate of change of the signals from the at least one temperature sensor and pressure differential/flow sensor. For example, the control software may monitor the temperature over a period of time to determine the cooling or warming of the water within the system. Also monitoring flow rates, or pressure differences, across specific zones making sure that there is no unnecessary energy being used or when more input is needed.

Monitoring flow rates or pressure differentials is important to a system as this procedure can detect or provide an advance fault warning, for example of blockages or restrictions within a system. In turn this may reduce diagnostic time when attempting to locate a fault. Some system engineers prefer to work with pressure differential/flow sensing devices when testing a system and therefore this feature is incorporated within the hydraulic unit.

Furthermore pressure differential/flow sensors are also a benefit to a system when there is reverse circulation/heat transfer within a system and temperature sensors may sense an incorrect reading. In such circumstances a differential/flow sensing device serves to clarify whether there is or is not any flow running through a zone.

The hydraulic unit may comprise a flow sensor. The processor may receive signals from the flow sensor and process the signals in accordance with control software. The flow sensor may be a single flow sensor, for example associated with the pump. The flow sensor may comprise a pair of differential pressure sensors positioned on opposing sides of the pump which may for example enable the flow at the pump to be determined.

An additional flow sensor/pressure differential sensor may be associated with each modulating zone valve, so as to accurately sense flow rates, leading from individual zones to the hydraulic unit. With this added flow rate data, when measured against the flow rate exiting the pump, the hydraulic unit can be operated to guarantee a dynamically balanced system.

The variable output pump may comprise a plurality of pumps. For example, in some embodiments a plurality of parallel pumps may be used to provide a required total combined pump capacity, as well as offering redundancy where a bank of pumps is deployed. In some embodiments the hydraulic unit may comprise a variable output pump for each heating zone. The provision of specific pumps, or banks of pumps, for each zone may provide further efficiency benefits for example enabling precise independent control of the flow through each zone. In such an example the system may for example be able to control the pump for a heating zone for maximum efficiency whilst effectively instantaneously responding to a need for hot water in another zone.

It is appreciated that the heat source may be a water boiler/heater (including for example a combi-boiler) including for example a gas-powered water boiler; an electric water heater; a solar powered water heating: a geothermal water heater or a heat pump; or any combination of the aforesaid heat sources. It is also appreciated that the hydraulic unit is created primarily to manipulate a fluid to be used to heat/cool a system and therefore can be adapted to any heat source or cooling source.

A bypass route may be provided between the variable output pump and the plurality of independently controllable valves. The bypass may for example, provide a safety feature to prevent system overpressure, as well as permitting parts of a system to be isolated for repair and maintenance. The bypass may for example be permanently open or may be auto-opened by a valve (for example a spring loaded valve) which is responsive to system pressure exceeding a limit. The pressure for opening of the bypass may be system specific for example, dependent upon the system size and/or pump size. Ideally therefore a hydraulic unit comprises its own controller, which can be configured to allow valves to continue to remain open according to temperature sensors and continue a pump overrun until a safe temperature has been meet.

In previous installations this was very difficult as all zones and valves were directly wired to shut on and off during demand without any other control and this meant a permanent bypass being needed with a pump overrun. However, a permanent bypass is no longer essential.

At least one heating zone may comprise a closed heating circuit. A heating zone may for example be a space heating circuit, for example including a plurality of radiators. A heating zone may for example be a hot water circuit which feeds and returns water from a cylinder (and may include one or more hot water outlet fed by the cylinder).

The common heat source may be a boiler/water heater.

In some embodiments at least one of the plurality of independently controllable valves may further comprise a flushing point. For example, in embodiments the independently controllable valve may comprise a removable portion, for example a removeable valve actuator, and the seat for the removable portion may be configured to removably receive a flushing assembly. The flushing assembly may for example comprise a flushing valve and a filter assembly. The filter assembly may be a magnetic filter. The flushing assembly may threading engage the body of the independently controllable valve.

A further aspect of the invention comprises a multi-zone heating system comprising a heat source, a plurality of heating zones, a controller and a hydraulic unit in accordance with embodiments.

The system may be a domestic water heating system. The plurality of heating zones may comprise at least one space heating loop and at least one hot water supply.

The hydraulic unit may be positioned on a return side of the heat source.

At least one heating zone may comprises a plurality of sub-zones. Sub-zones or components within a zone (for example individual radiators) may be provided with localised valves or controls for example individual thermostatic radiator valves.

As well as modulating zone valves being fitted to each individual dwelling when being fitted to wirelessly control flow, a closed-circuit heating system within each individual dwelling may incorporate auto balancing radiator valves which are controlled by an overall controller in the plant room via a user controller located in each individual dwelling.

Another advantage of this is that the controller can be configured to send an error code, via a transmitter, to a mobile communications device which has been modified with application specific software (APP) in order to perform remote control and/or remote fault detection. This enables an engineer or operator to perform remote diagnosis and control of the system, for example via their smartphone.

Valves, sensors and actuators are connected wirelessly so that thermostatic radiator valves become integral to the auto balancing and control. This ensures that the system is able to ensure a reduction in flow rate when a thermostatic radiator valve shuts off flow when an ambient temperature is met. Therefore wirelessly controlled thermostatic radiator valves and auto balancing valves all sending data wirelessly to a user controller. This in turn commands a plant room override controller to balance every radiator in every dwelling within a building.

Additionally when incorporated in a dwelling, which has its own storage heater for hot water, an extra auto balancing valve may be used to determine flow. This enables the storage heater to transmit a wireless signal to the controller to allow a balanced flow, not only to the radiators but also to the storage heater.

Once data from the modulating zone valves, incorporated with temperature and flow sensing devices, auto balancing radiator valves, thermostatic radiator valves and any additional balancing valves have been sent to the override controller in the plant room via the user controllers in each individual dwelling, full flow control is accomplished.

It will be appreciated that having all of this data not only allows a system to maximise efficiency but also provides a fault log and diagnostics log which an engineer can study to track and find any faults. This system can flag faults to be repaired in minimal time before excess damage is caused. This reduces the chances of major components breaking down over a long period of time. This also reduces the time taken to diagnose a problem with much larger systems.

Originally, systems would be manually balanced, and multiple air locks would need to be purged from a system, the larger the system, the longer the time taken to completely purge a system manually. This would require multiple engineers to configure all areas of the system for perfect flow rate and delta T across all radiators and zones etc. (In all instances the system would be leak tested and filled first).

With the system stated above, only one engineer is required and would only have to log into the plant room main controller and set the system to "purge mode".

With all data described above the system would self-fill and purge all air from all radiators and all zones, auto balance to meet optimum efficiency as required across the system.

It is understood that at least one temperature sensor may sense a mixed flow from two or more zones. This is because in some embodiments, when fitted to a combination boiler for example, hot water supply tends to be prioritised over heating. What is therefore required is to ensure that a return temperature does not drop below a pre-set threshold when a valve to a central heating zone is opening slowly, as this tends to cause hot water temperature and water pressure to fluctuate from hot to cold and high to low. This has tended to occur when a single temperature sensor is deployed.

To overcome this a single temperature sensor may be provided which senses where two return temperatures mix so as to maintain the boiler at a balanced temperature. This option is a cheaper way of creating the same benefits in this particular arrangement.

Preferred embodiments of the invention will now be described, with reference to the following Figures in which:

DETAILED DESCRIPTION OF PREFERRED EMBODIMENTS OF THE INVENTION

Figure 1:
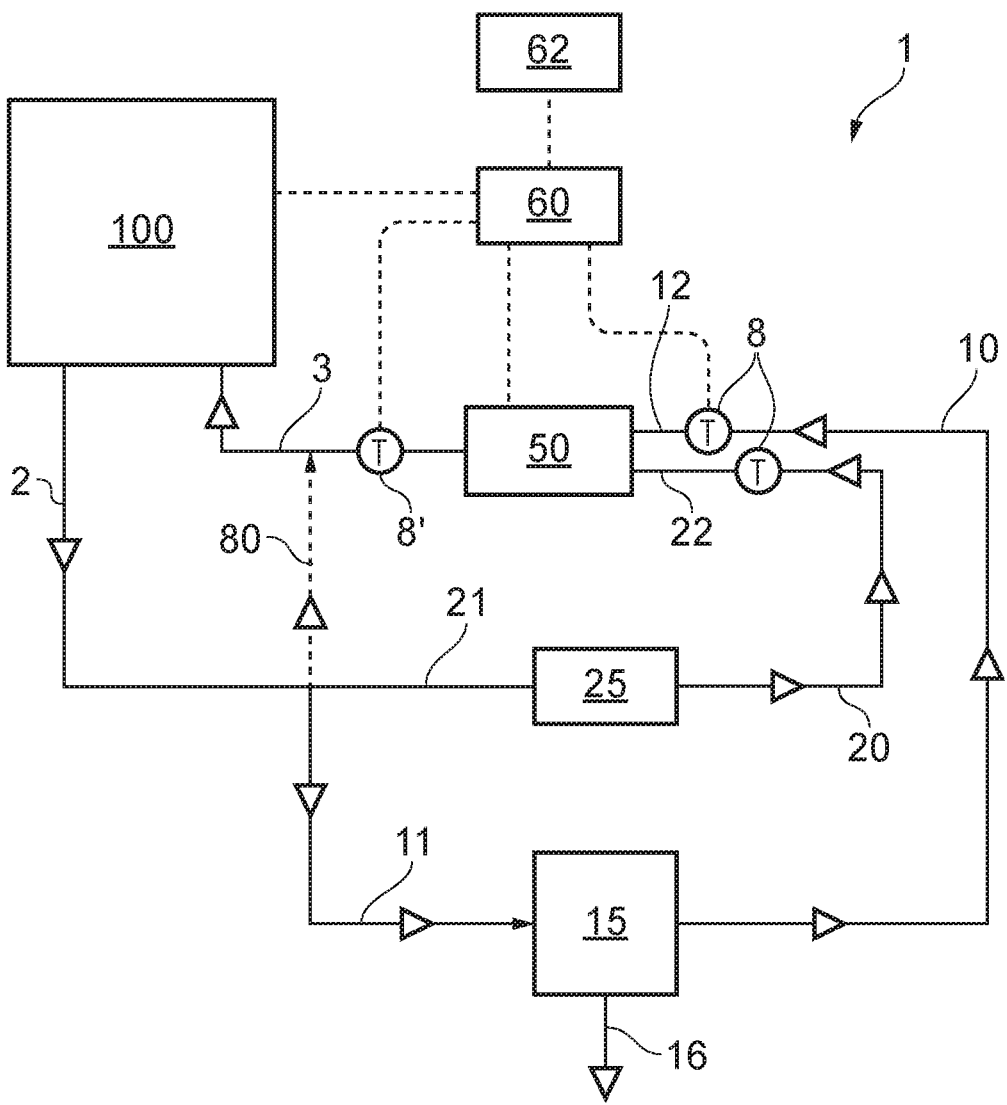
FIG. 1 shows a schematic representation of a multizone heating system in accordance with an embodiment.

A heating system 1 in accordance with an embodiment is illustrated schematically in FIG. 1. The heating system may be a domestic hot water and space heating system and includes two heating zones 10 and 20 which are each closed loops that receive hot water from a heater/boiler 100.

The heating system has an out flow 2 and a return 3 to the boiler 100. The flow splits into the separate circuits 10 and 20 of the heating zones which each have a respective inlet 11, 21 and return 12, 22. In the illustrated embodiment the first circuit/zone 10 is a hot water loop and includes a cylinder 15 which may have a hot water outlet 16.

The second circuit/zone 20 is a space heating circuit and includes at least one radiator 25 (or typically a plurality of radiators which may be arranged in a number of sub-zones, for example in parallel or series). A hydraulic unit 50 in accordance with embodiments is provided at the return 3 to the boiler 100 and receives the return flow lines 12, 22 from both heating zones 20, 10. A controller 60 is in communication with the hydraulic unit 50 and boiler 100. The hydraulic unit comprises two modulating zone valves, each zone valve has its own temperature sensor which can be in or next to the valve. The modulating zone valve also comprises a flow sensing device which can be in or next to the valve. Therefore, the controller 60 is also in communication with the temperature sensors and flow sensors within the hydraulic unit. The hydraulic unit also consists of a modulating pump with a flow sensing device, the controller is also connected to this flow sensing device/s and the modulating pump. The controller 60 may be connected to additional temperature sensors on the system external to the hydraulic unit.

In this way a second, optionally smaller boiler, removes the additional load of having to heat two heating zones from a larger boiler. This second boiler effectively provides a completely separate system. Again it is appreciated that the hydraulic unit may be adapted to oversee two space heating zones. Optionally additional hydraulic units may be provided where a larger boiler heats two or more heating zones.

This enables one or more space heating loops or at least one hot water supplies or at least one space heating loop and one hot water supply to be serviced at the same time.

In this configuration a smaller boiler is able to heat two heating zones and a much larger boiler which is separate and may for example heat a swimming pool heat exchanger.

Optionally, the heating system may be fitted with a bypass 80 which may for example provide a direct return route between the output 2 and the return 3. The bypass may divert flow past the hydraulic unit 50 for example to protect the pump against overpressure damage.

However, as the system has an independently controlled hydraulic unit via a controller, it can be set to allow the hydraulic unit to allow flow through the valves, via the modulating pump, which were in demand while the heat source is shut down. Therefore temperature and pressure is reduced, then the entire system shuts off once a pre-determined temperature is met. This setting may also be used in some systems as a "free comfort mode".

This is used to pre heat a secondary heat exchanger that may hold stored water. This allows the time taken for hot water to reach the faucet to shorten. In most cases a heat source would have to use extra energy to do this in its own time but while the spare heat is circulating to cool itself down unnecessarily, it would seem wise to use this energy to preheat a secondary heat exchanger. With all this said, all systems, unless specified to, would not need a bypass when fitted with the hydraulic unit configuration.

Figure 2:
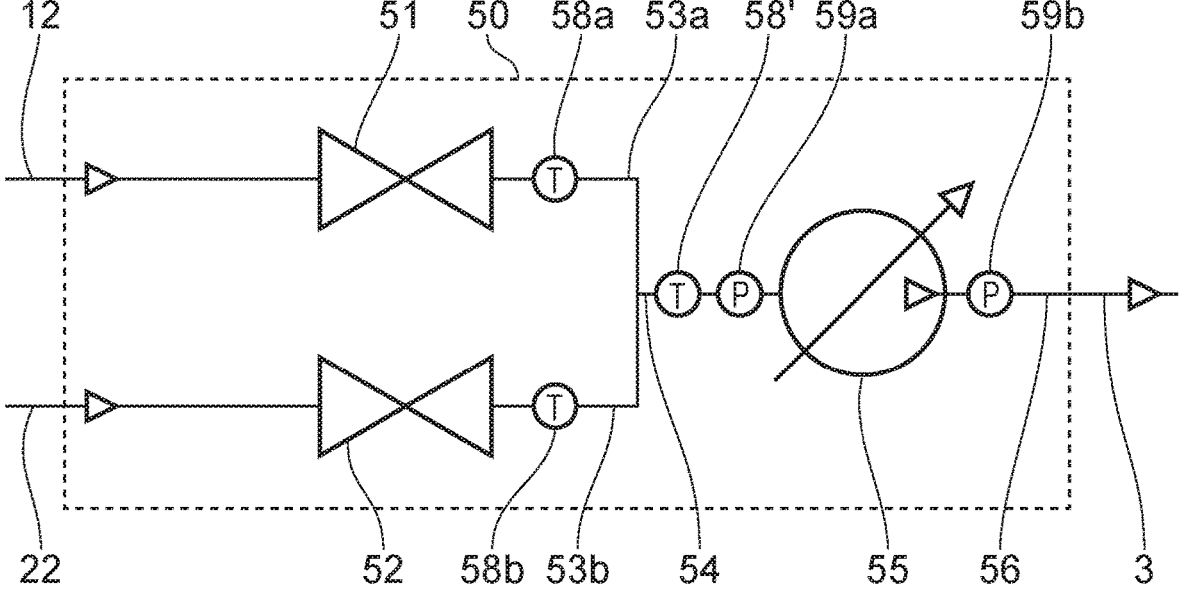
FIG. 2 shows a schematic representation of a hydraulic unit for use in embodiments of the invention.

The configuration of the hydraulic unit 50 is shown in FIG. 2. The hydraulic unit 50 includes an independently controllable modulating valve 51, 52 for each of the respective zones 10, 20. Valve 51 is in communication with the return line 12 of the first zone 10 and valve 52 is in communication with the return line 22 of the second zone 20.

It will be appreciated that further valves may be provided for additional zones as required. The hydraulic unit further comprises a variable output pump 55 which receives flow from the valves 51, 52 and feeds an output line 56 to supply the return line 3 of the boiler 100.

Thus, flow through the heating zones 10, 20 is via the pump 55. In the configuration of FIG. 2, the output lines 53a, 53b from the valves 51, 52 are fed through a common manifold 54 to the pump 55. Temperature sensors may be provided in the hydraulic unit 50, either within the modulating zone valves or further down the output lines 53*a*, 53*b*. for example individual sensors 58*a* and 58*b* on the output lines or a common temperature sensor 58' on the combined flow in the manifold 54.

Alternatively or additionally, the hydraulic unit 50 may use temperature sensors 8, 8' located on the return lines external to the hydraulic unit 50. Flow sensors may also be provided in the hydraulic unit 50. For example, a pair of differential pressure sensors 59*a* and 59*b* can be provided on opposing sides of the pump 55. Also there are provided flow sensing devices located on either modulating zone valves 51, 52 or further 'down line', in an output lines 53*c*, 53*d*. The valves 51, 52, sensors 53, 58, 59, and pump 55 are all connected to the controller 60.

Figure 3:
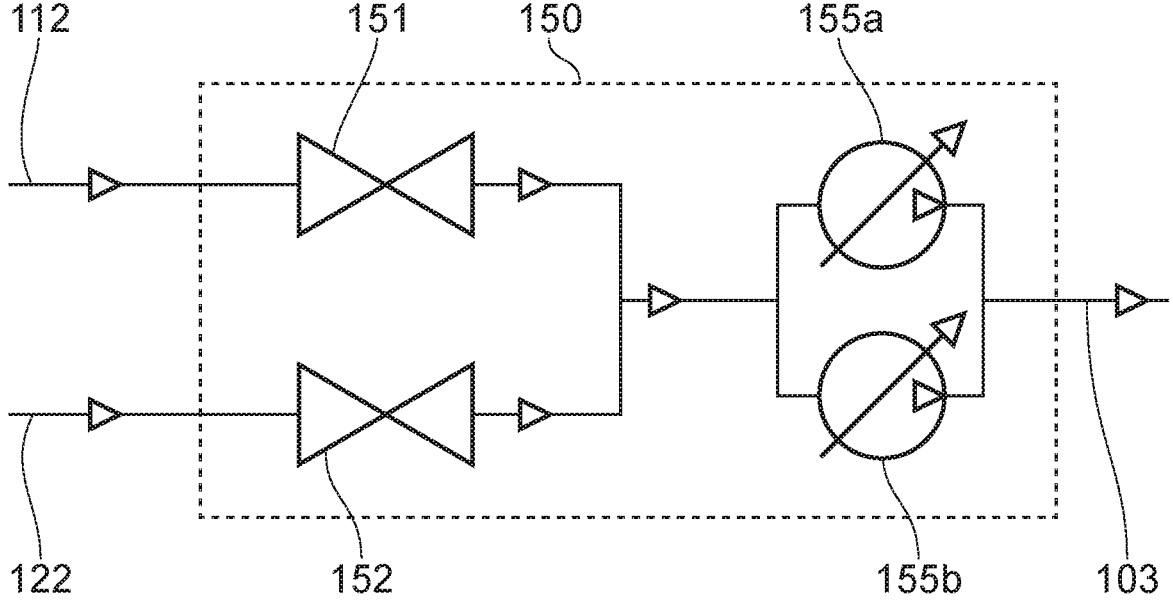
FIG. 3 shows a schematic representation of an alternate hydraulic unit for use in embodiments of the invention.

In some embodiments the pressure requirements of the system may necessitate the provision of a hydraulic unit 150, as shown in FIG. 3, having a plurality of pumps 155. The overall configuration of such an embodiment may be generally consistent with a single pump embodiment (and similar components are indicated with the same reference numerals prefixed with a 1). As may be noted in this embodiment the pumps 155*a*, 155*b* are simply arranged in parallel but operate in the same manner as the single pump embodiment of FIG. 2.

Figure 4:
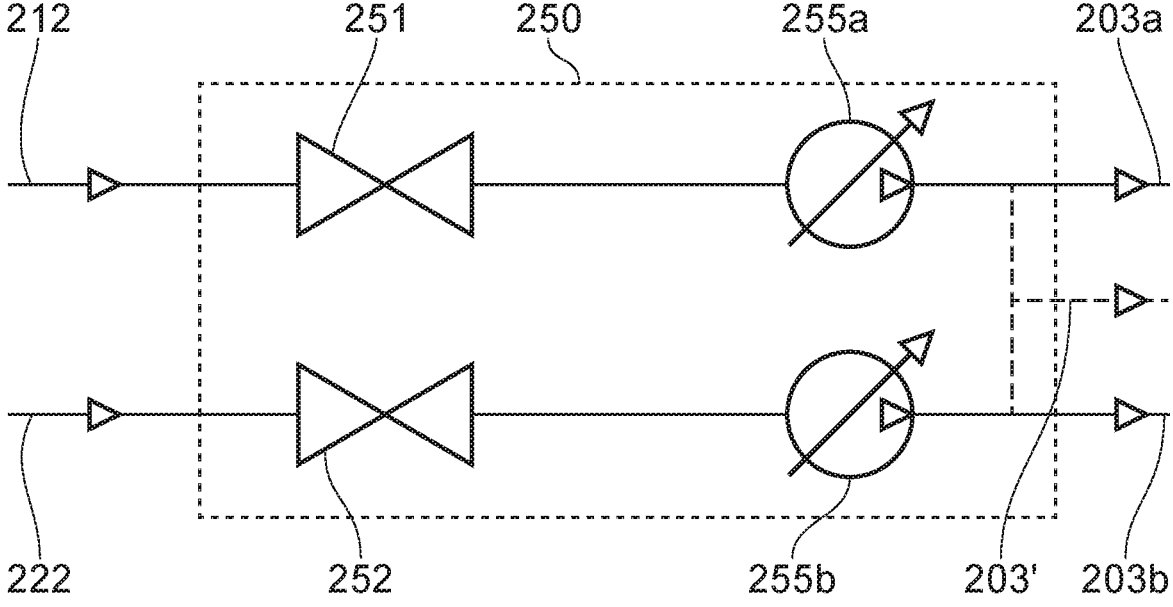
FIG. 4 shows a schematic representation of a further alternate hydraulic unit for use in embodiments of the invention.

Alternatively, as shown in FIG. 4 in some embodiments dedicated pumps 255*a* and 255*b* may be provided each associated with one of the zones. As such the hydraulic unit 250 of this embodiment includes for each zone: an independent input 212/222, a valve 251/252 and a pump 255*a*/255*b*. Depending upon the system configuration the hydraulic unit 250 could be provided with separate return lines 203*a* and 203*b* for each zone or could have a single combined return line 203'. As previously stated, a system may benefit from separate return lines 203*a* and 203*b* when two separate heat sources are used in two separate systems.

Figure 5A:
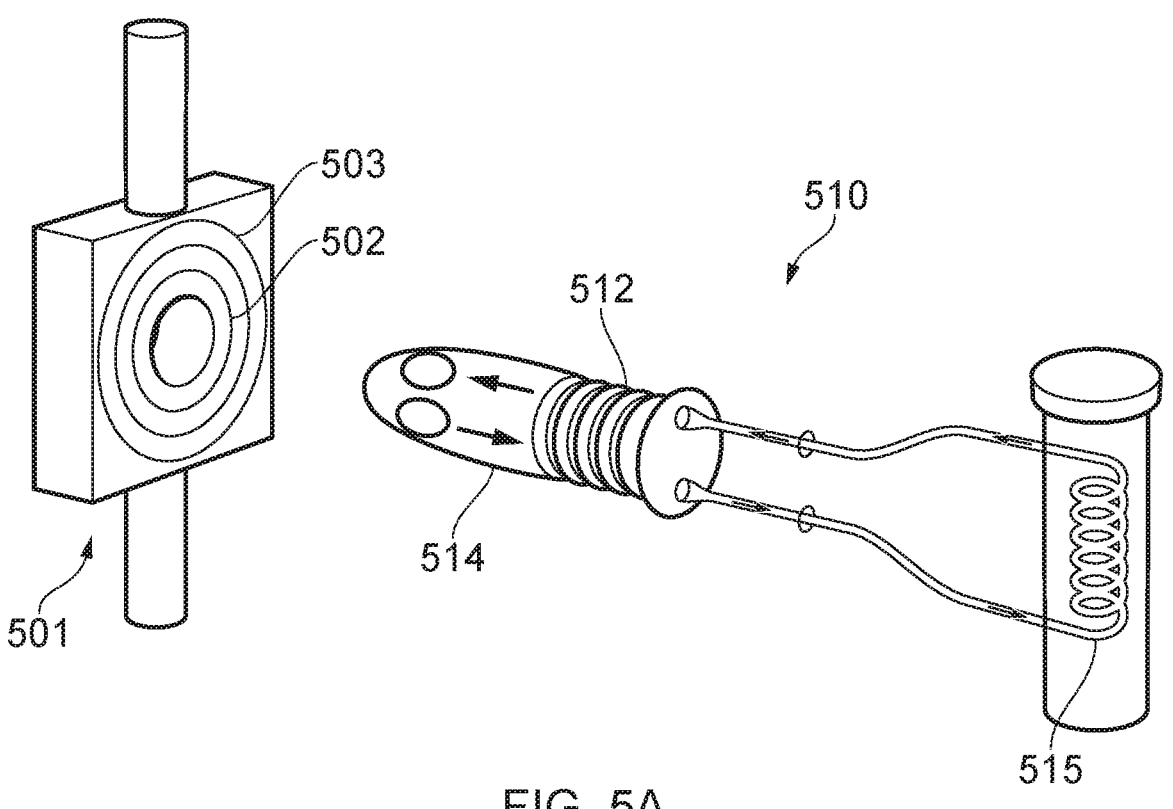
FIGS. 5A and 5B illustrate the inclusion of a flushing assembly for use in embodiments.

Conveniently, the independent control valves 51/52, 151/152, 251/252 may also be used as flushing points for the heating system. As shown in FIG. 5A the body of the valves 501 may include a threaded bore 502 sealed with an O-ring 503. In normal operation this threaded bore can receive the valve actuator. For system maintenance the valve actuator may be removed and a flushing valve 510 may be inserted into the valve body 501. The flushing valve 510 has a valve body including a threaded collar 512 for engaging the threaded bore 502 and a flow diverter 514.

Figure 5B:
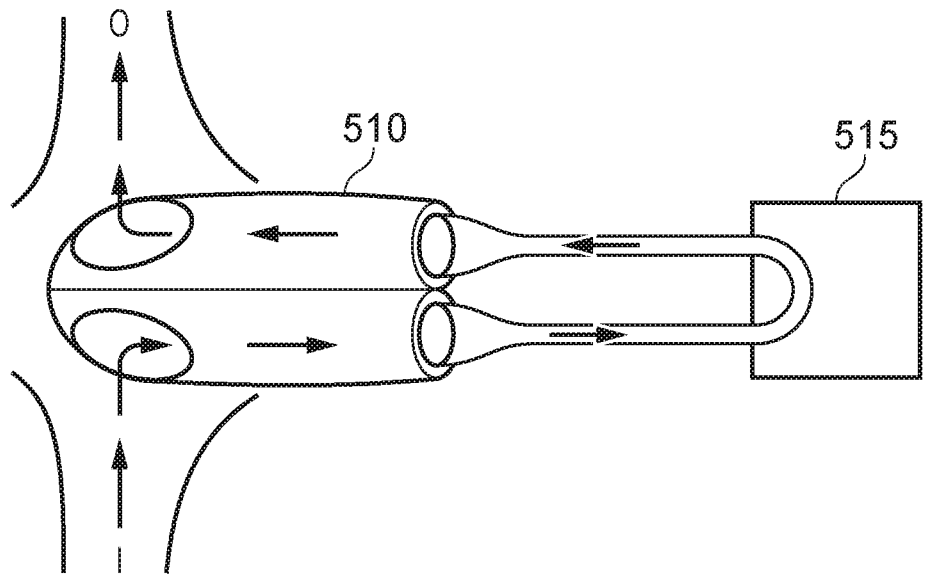

The flow diverter passes the system flow through a filter 515 which may for example be a magnetic filter. The filtering function is show schematically in FIG. 5B with the flushing valve 510 diverting incoming flow (represented by arrow "I") through the filter 515 and returning it to the system (in the direction of output arrow "0").

Some of the advantages of embodiments of the invention in use will now be described in further detail.

Embodiments enable the controller 60 to actively balance and/or purge the heating system 1 by the controller using the independent valves 51/52, 151/152, 251/252 and the speed of the pump(s) 55, 155, 255 to provide an optimised flow through each zone 10, 20 across a variety of operational situations. The controller may maximise efficiency by both ensure that the energy (i.e. the flow rate and heat) supplied to each zone closely matches that required and by ensuring that return flows to the heater 100 are at cool temperatures (which allows the heater itself to work more efficiently).

For example, in a space heating zone there may typically be a number of radiators 25 and each may be fitted with an individual thermostatic radiator valve. These such thermostatic valves close off a radiator once the local ambient temperature is reached. In embodiments of the invention, the controller can respond to this decreased demand by reducing the output of the pump so that only the amount of energy required by the zone is supplied rather than the pressure in the system increasing if a constant pump were used. Likewise, the controller could use the variable output pump to respond by increasing the pump speed if a radiator subsequently activated. In parallel the controller can also further adjust the flow in each zone (for example the relative flow in the zones) by controlling the extent to which the independent control valves of the hydraulic unit are opened.

In use, a user demand signal is sent to the heat source 100 (for example from the user interface 62 or by the use of a hot water outlet) causing the controller 60 to activate the hydraulic unit 50. The controller 60 activates or adjusts valve(s) 51/52, 151/152, 251/252 associated with the zone and activates the variable output pump 55, 155, 255. Using data from the return temperature thermostat(s) 8, 58 and the flow sensing device 53*c*, 53*d* the controller 60 instructs the pump to run at a specific flow rate to suit user demand.

For example, hot water is demanded (from zone 10) and the primary heat source 100 is cold, the controller would understand this via flow 59 and temperature sensors 8, 58 and run the pump 55 at full rate. Once hot water is up to temperature and the return temperature has balanced out the primary heat source 100 may modulate lower than full rate, at this stage the pump 55 may also do so to save on electrical energy. This is because it would be seen as a top up of energy once a predefined temperature has been met. Or if a specific cold-water inlet flow rate is lower than the appliance is able to heat up and would not need to use full input to achieve the desired hot water flow rate. In some embodiments this may achieve low return temperatures back to primary heat sources which can produce a higher efficiency of a primary heat source.

Domestic hot water (zone 10) demand would typically take priority until a predetermined set temperature is an achieved. Once this predetermined set temperature is achieved, a user would be able to ask for space heating (from zone 20) as well as hot water generation (typically the set temperature may take only a few seconds to achieve). While the primary heat source 100, hot water zone valve 51 and modulation pump 55 are running for hot water generation, the integral dual zone valve 52 will open up to a certain degree and a return temperature is monitored within the valve, for example by temperature sensor 58*b*.

As the controller 60 understands that a secondary zone 20 is opening and temperatures are decreasing it causes the primary heat source 100 to modulate to a higher rate of heat transfer. At the same time, the controller causes the pump 55 to increase pump speed to suit flow rate needed to accommodate more water passing through the hydraulic unit. Again, as return temperatures start to rise or stabilise, the heating zone valve 52 opens until a full flow is achieved and the modulating pump 55 then commences pumping and sets its pump speed to the desired speed needed for the volume of water being pumped around the system 1.

As noted above, if a space heating zone 20 incorporates radiators 25 with thermostatic radiator valves, they may shut down flow to each individual radiator while an overall room thermostat is asking for heat demand. In traditional systems the manufacture would generally specify that a radiator with permanent lock shield valves or a permanent bypass be fitted. In a system in accordance with embodiments the flow sensor 59 within the pump 55 and temperature sensor(s) 58/8 ensure that the controller 60 can accurately sense when a system is reaching zero flow rate and reduce the pump speed until a maximum pressure and temperature is sensed. At that point, the controller shuts down the primary heat source 100 and continue to run the hydraulic unit 50 of until a predetermined temperature and pressure is met then they too shut down shortly after.

In the case of a sudden flow shut off, all zones 10, 20 may automatically open up to dump any latent heat once the primary heat source 100 has shut down.

Advantageously, embodiments of the invention may enable the controlled to prevent confusion between an actual fault with a system and human error since the controller 60 may use the temperature signals form the hydraulic unit in conjunction with the flow sensor signals. For example, the controller can be instructed to use the temperature and flow signals from the hydraulic unit to shut off the primary heat source if a maximum pressure/minimum flow rate is exceeded and/or temperature differential between both zone temperature stats and primary heat source flow/return temperature stats exceed a predetermined temperature difference.

For example, if a thermostatic radiator valves fails or is set incorrectly the space heating may be determined via a room thermostat rather than the thermostatic radiator valve. This can result in minimal to no flow rate on initial start-up as all thermostatic radiator valves are shut off. In embodiments of the invention the hydraulic unit signals would enable the controller to identify this issue. The controller may, therefore, shut the primary heat source down and send an error code, saving many components including the primary heat source from additional damage.

Another problem maybe blockages within a system, again the hydraulic unit would enable the controller to shut down before any more damaged occurred and an engineer could fix the problem and restart the unit once again.

Another advantage of embodiment is that as either zone is completely separate (and in some embodiments so is the pump) it could send separate fault codes for each individual zones. For example, a valve may be shut off leading to a cylinder and the pump and zone valve sense temperature and flow rate fluctuations, sends an error code but because the other zone is working well, the primary heat source is kept working in the meantime. An engineer can visit and solve the problem without having to shut down the entire system.

When a hot water zone 10 is being used to indirectly heat a stored water cylinder 15 embodiments of the invention may further increase efficiency and reliability of a system by enabling a predetermined set temperature to be reached before needing to pump overrun. Once the controller of the hydraulic unit has communicated with the primary heat source and the cylinder thermostat, it is able to calculate a time period between shutting off the primary heat source and reaching the cylinder thermostat set temperature to allow the primary heat source to cool enough before shutting off the zone and pump without needing a bypass.

Figure 6:
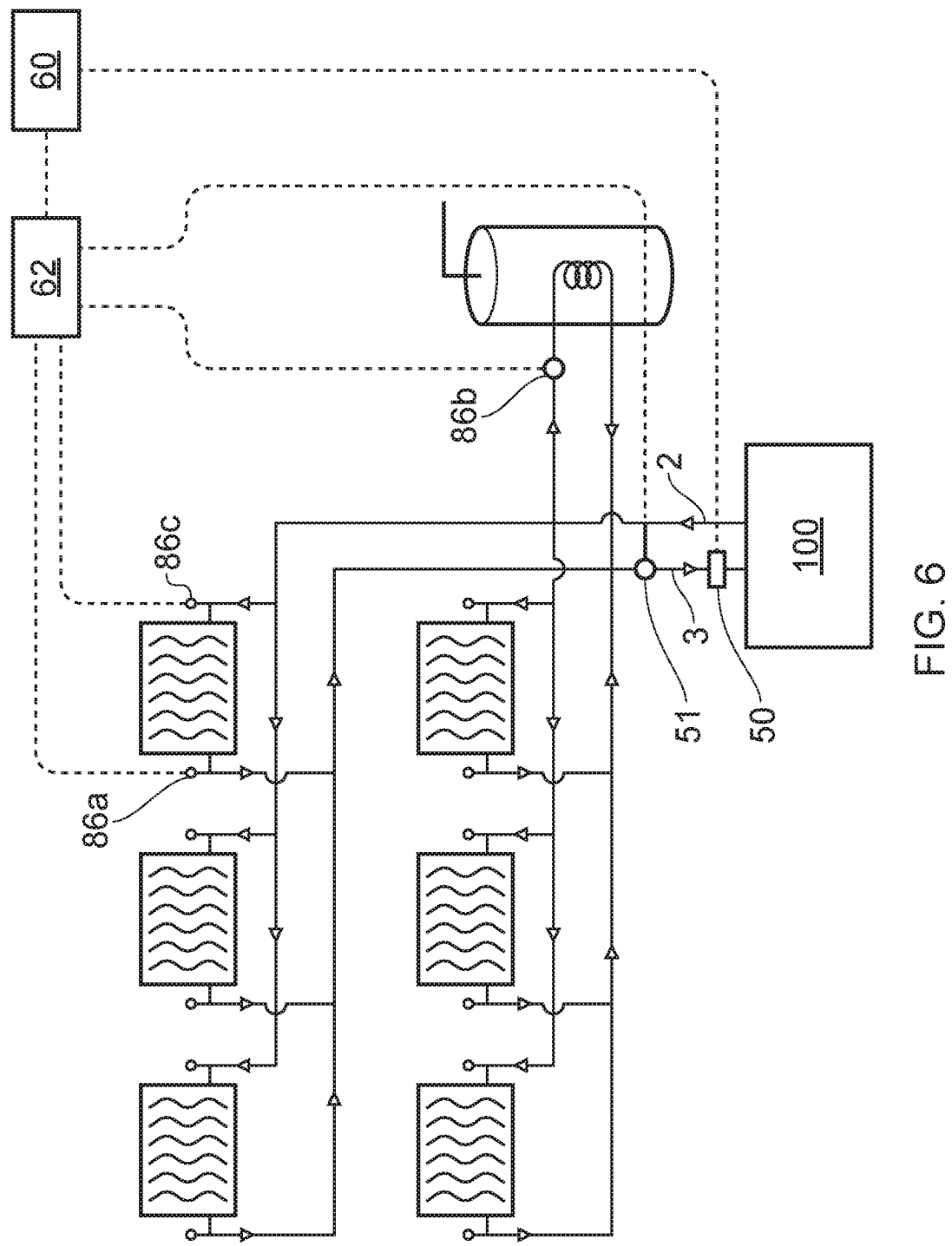
FIG. 6 shows an addition to control of zones, the hydraulic unit may be used to control all radiators and additional zones within dwellings.

FIG. 6 shows how, in addition to controlling zones, the hydraulic unit may be used to control all radiators and additional zones within dwellings. It may comprise a one or more automatically controlled radiator balancing valves with wireless control 86a. It may comprise one or more thermostatic radiator valves which are also wirelessly controlled 86c.

It may comprise 1 or more automatically controlled balancing valves with wireless control 86b, situated on a return pipe leading from a stored water unit such as a vented cylinder.

It may comprise a user controller 62, to examine all data from the auto radiator balancing valves 86a, auto balancing valves 86b, thermostatic radiator valves 86c and the main modulating zone valve 51 returning to the heat source from the dwelling via wireless signals.

This would then send the data to the main controller within the plant room 60, wirelessly, which would then instruct the modulating pump 55 within the hydraulic unit 50 to set a desired flow rate and run the heat source at the same time.

In this way, complete control over the entire system down to the smallest circuit can be achieved and no extra energy would be wasted.

It should be said that wirelessly controlled thermostatic radiator valves are well known necessity to this schematic when relaying information back to the control unit to state whether a radiator is shutting down due to ambient temperature or there is a fault within the system.

Figure 7:
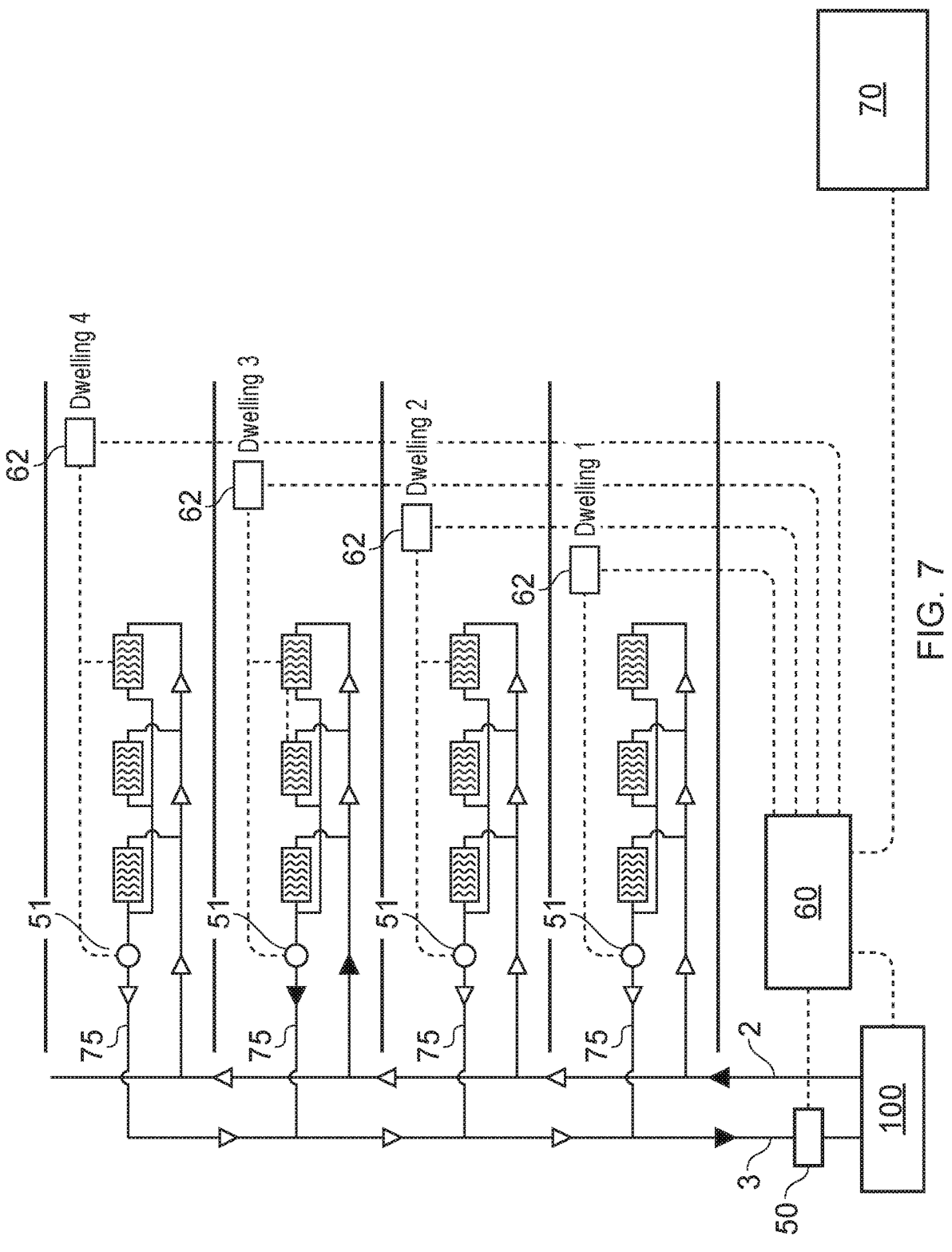
FIG. 7 shows diagrammatically how the hydraulic unit may be retrofitted to existing buildings.

FIG. 7 shows how the hydraulic unit may be retrofitted to existing buildings. In this way, the modulating, independently controlled zone valves 51, may be fitted on return pipe 75, leading towards the hydraulic unit 50 and heat source 100. The modulating independently controlled zone valves send data via their temperature and flow sensors to the user controller 62 for that dwelling that it is situated. If demand is needed, that user controller 62 then sends a signal to the main controller 60 within the plant room. The main controller 60 sends a signal to the modulating pump 55 within the hydraulic unit 50 to set a desired flow rate and run the heat source at the same time.

Temperature sensors may be located on the flow, as well as on the return pipework, which is connected to a zone or a sub-zone. The system therefore has the ability to reduce or increase a temperature differential ("delta T") across zones and/or sub-zones, so that exact temperatures can be used to obtain different output temperatures from a heat source such as a boiler, for example. This precise control is achieved by reducing or increasing flow rate across a zone and/or a sub-zone, then monitoring the temperature differential until a correct temperature output is achieved, so as to heat the zone and/or sub-zone which is being supplied.

Optionally a weather compensation controller may be used to improve efficiency of the system and efficiency of the controller. Weather compensation control means maintain internal temperatures by varying the flow temperature from the heat source relative to the measured outside temperature. When included with the system a weather compensation controller enables the controller to compensate within each zone and/or sub-zone rather than throughout an entire dwelling which was previously the case.

In the past weather compensators have only been able to govern effectively the entire dwelling and reduce temperature from a heat source but have never been able to oversee different temperatures to radiators in different rooms, for example which may be located on a northern side of a building, compared with those rooms which face the sun on a southern side of a building, because the heat source or boiler was only capable of outputting water at a given temperature.

This problem is now overcome because individual flow rates can be controlled precisely and therefore temperature differentials between zones or sub-zones can be managed.

For example, a radiator with a mean temperature of 50° C. and a design temperature of an ideal room temperature of 21° C. provides a 1 kW. If the mean temperature is reduced to 35° C. then the radiator output falls to 600 W. A weather compensator, which provides a signal to the controller, enables this to occur, even when the temperature difference between inside a dwelling and outside a dwelling are very close, for example when an external temperature is 18° C. and there is a 21° C. demand from a thermostat within a dwelling.

Another benefit of using temperature sensors located on the flow as well as return pipework in a zone or sub zone is that heat losses can be quickly and accurately identified throughout all areas of the system. For example if a 65° C. output is provided by a heat source and water arrives at 30° C., at a correct flow rate, a substantial amount of heat has been lost heat which might prompt investigation to be made, for example to locate unlagged pipework.

Such a configuration may also be used when reduced pipework is needed within a building as each wirelessly controlled zone can be fitted into a separate dwelling on the return pipework returning back to the hydraulic unit 50 and heat source 100.

Figure 8:
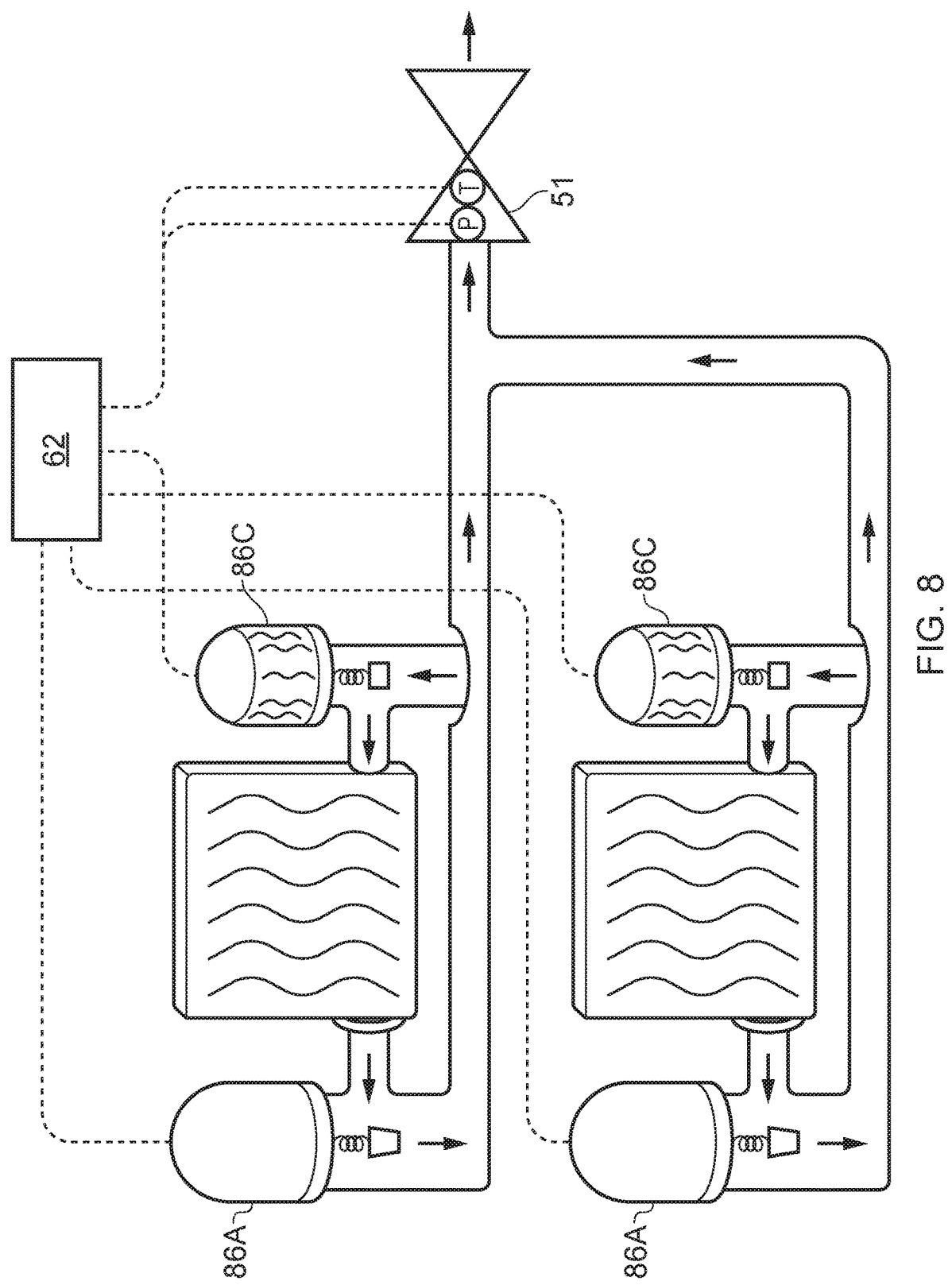
FIG. 8 shows an overall view of a system fitted with a controller which receives data from auto radiator balancing valves and thermostats.

FIG. 8 shows an overall view of a system fitted with a controller which receives data from auto radiator balancing valves and thermostats. FIG. 8 shows automatically controlled radiator balancing valves with wireless control 86a and one or more thermostatic radiator valves 86c which are also wirelessly controlled via, for example using Bluetooth (RTM) wireless protocol, communication devices. Other types of short range wireless control devices, such as Zigbee (RTM) wireless protocol devices may also be deployed.

The system shown in FIG. 8 has automatically controlled balancing valves 86b operating under wireless control. These balancing valves are shown on a return pipe leading from a stored water unit, such as a vented cylinder.

Further variation may be made to the hydraulic assembly so as configure it to be suitable for use with a plurality of zones. Such a configuration may comprise an odd number of zones. For example if there are nine zones, one zone is potentially wasted because ideally the system optimises an even number of zones.

The invention can be enabled to suit any other heat source available, increasing efficiency, such as for example hydrogen burners and heat pumps.

If required, two or more hearting zones require at least two valves which communicate one with one another so as to modify and correct flow temperatures.

Although the invention has been described above with reference to preferred embodiments, it will be appreciated that various changes or modification may be made without departing from the scope of the invention as defined in the appended claims.

For example, whilst the Figures above represent the hydraulic unit in a single location, it will be appreciated that the valves and pump may be spaced apart by suitable piping if this is more appropriate for a particular heating system. This may for example be necessary where a hydraulic unit is retrofitted to an existing heating system with existing spacing constraints.

The invention claimed is:

1. A multi zone heating system, comprising:
a common heat source therefor;
a pump;
a plurality of heating zones, at least one of the plurality of heating zones having a plurality of sub-zones; and
a hydraulic unit, wherein the hydraulic unit comprises:
a plurality of independently controllable valves, each of the plurality of independently controllable valves being associated with a supply to each of the plurality of heating zones and operative to supply the at least one of the plurality of heating zones, and the plurality of sub-zones therewithin, with heated water from the common heat source-via the pump,
a controller which operates the plurality of independently controllable valves and controls an output of the pump,
a flow sensor,
at least one temperature sensor, and
a processor which receives a temperature signal from the at least one temperature sensor, associated with one of the plurality of heating zones, and a flow signal from the flow sensor, associated with the one of the plurality of heating zones,
wherein the processor is operative to process the temperature signal and the flow signal in accordance with control software and to issue a command signal to the pump and to at least one of the plurality of independently controllable valves to vary a flow rate of water from the common heat source to the one of the plurality of heating zones associated with the flow signal and the temperature signal,
whereby the at least one of the plurality of independently controllable valves is operable to divert heated water to the one of the plurality of heating zones in response to the temperature signal from the at least one temperature sensor associated with the one of the plurality of heating zones,
wherein one or more of the plurality of sub-zones within the at least one of the plurality of heating zones includes one or more radiators having one or more modulating valves; and
the processor is further configured to receive a pressure differential signal from a pressure differential sensor, process the temperature signal, and the flow signal in accordance with control software and issues command signals to the pump and the one or more modulating valves, to vary the flow rate of water from the common heat source to each of the plurality of heating zones independently one to another, thereby enabling the hydraulic unit to control balancing of heating of the plurality of sub-zones, and
at least one of the plurality of independently controllable valves further comprises a flushing point to enable a selected one of the plurality of heating zones to be tapped.

2. The system according to claim 1, wherein the processor is further configured to receive signals from a pair of the differential pressure sensors positioned on opposing sides of the pump.

3. The system according to claim 1, further comprising a bypass between the pump and the plurality of independently controllable valves.

4. The system according to claim 3, wherein
the plurality of independently controllable valves comprise a removable valve actuator, and
a seat for the valve actuator is configured to removably receive a flushing assembly.

5. The system according to claim 1, wherein the at least one temperature sensor is provided on a return line to the common heat source.

6. The system according to claim 5, wherein the pump is a variable output pump comprising a plurality of pumps.

7. The system according to claim 5, wherein, when the processor receives a demand signal from the at least one of the plurality of heating zones, the processor is operative to compare the demand signal with the temperature signal to determine a required flow rate prior to issuing a command signal to the pump.

8. The system according to claim 6, wherein the hydraulic unit comprises at least one of the pump for each heating zone, the pump being a variable output pump.

9. The system according to claim 5, wherein the at least one of the plurality of heating zones comprises a closed heating circuit.

10. The system according to claim 1, wherein the common heat source comprises at least one of: a boiler, a water heater, a hydrogen burner or a heat pump.

11. The system according to claim 1, wherein the system is a domestic system, and the plurality of heating zones comprise at least one space heating loop and at least one hot water supply.

12. The system according to claim 11, wherein the hydraulic unit is positioned on a return side of the common heat source.

13. The system according to claim 11, wherein a zone valve senses temperature and flow rate fluctuations, and the controller sends an error code when a fault is detected.

14. The system according to claim 11, wherein the controller has a transmitter which sends an error code to a mobile communications device, which has been modified with application specific software (APP), to perform remote control and/or remote fault detection.

15. The system according to claim 11, includes a weather compensation controller which is used to improve efficiency of the system and efficiency of the controller.

* * * * *